(12) United States Patent
Nakagawa et al.

(10) Patent No.: US 12,515,439 B2
(45) Date of Patent: Jan. 6, 2026

(54) ELASTIC LAMINATE

(71) Applicant: NITTO DENKO CORPORATION, Osaka (JP)

(72) Inventors: Muneshige Nakagawa, Ibaraki (JP); Sho Uchida, Ibaraki (JP); Shinsuke Ikishima, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 724 days.

(21) Appl. No.: 17/603,158

(22) PCT Filed: Apr. 16, 2020

(86) PCT No.: PCT/IB2020/053612
§ 371 (c)(1),
(2) Date: Oct. 12, 2021

(87) PCT Pub. No.: WO2020/212906
PCT Pub. Date: Oct. 22, 2020

(65) Prior Publication Data
US 2022/0194048 A1    Jun. 23, 2022

(30) Foreign Application Priority Data

Apr. 17, 2019   (EP) .................................. 19169837

(51) Int. Cl.
*B32B 5/02* (2006.01)
*B32B 5/04* (2006.01)
(Continued)

(52) U.S. Cl.
CPC ................ *B32B 5/04* (2013.01); *B32B 5/022* (2013.01); *B32B 27/08* (2013.01); *B32B 27/12* (2013.01);
(Continued)

(58) Field of Classification Search
CPC ............ B32B 2250/40; B32B 2250/05; B32B 2307/51; B32B 27/302; A61F 13/00; A61F 13/56–60
See application file for complete search history.

(56) References Cited

U.S. PATENT DOCUMENTS 5,342,858 A * 8/1994 Litchholt ................... C09J 5/08
  524/505
5,358,783 A * 10/1994 Diehl ..................... C09J 153/02
  428/355 R
(Continued)

FOREIGN PATENT DOCUMENTS

| CN | 101977577 | 2/2011 |
| CN | 104540679 | 4/2015 |

(Continued)

OTHER PUBLICATIONS

Chinese Office Action issued in Chinese Patent Application No. 202080028724.0 dated Feb. 2, 2023 and English translation thereof.
(Continued)

*Primary Examiner* — Maria V Ewald
*Assistant Examiner* — Daniel P Dillon
(74) *Attorney, Agent, or Firm* — GREENBLUM & BERNSTEIN, P.L.C.

(57) ABSTRACT

Provided is an elastic laminate comprising a multilayer film comprising first elasticity skin layers arranged on both sides of a second elasticity core layer, said second elasticity core layer having higher elasticity than the sandwiching first elasticity skin layers, wherein the first elasticity skin layers comprise an olefin polymer, and the second elasticity core layer comprise an elastomer layer, and
said multilayer film having arranged on both outer surfaces thereof non-woven layers bonded either (i) through hotmelt pressure-sensitive adhesive layers or (ii) by means of ultrasonic bonding or thermal bonding,
(Continued)

wherein the elastic laminate is characterized by an elongation strength of less than 20 N/50 mm width when elongated by 50% with 300 mm/min elongation speed.

13 Claims, 3 Drawing Sheets

(51) Int. Cl.
    *B32B 27/08*           (2006.01)
    *B32B 27/12*           (2006.01)
    *B32B 27/30*           (2006.01)
    *B32B 27/32*           (2006.01)
    *B32B 37/14*           (2006.01)
    *B32B 37/12*           (2006.01)
    *B32B 38/00*           (2006.01)

(52) U.S. Cl.
    CPC ............ *B32B 27/302* (2013.01); *B32B 27/32* (2013.01); *B32B 37/144* (2013.01); *B32B 2037/1215* (2013.01); *B32B 2038/006* (2013.01); *B32B 2250/05* (2013.01); *B32B 2250/40* (2013.01); *B32B 2307/51* (2013.01); *B32B 2307/54* (2013.01); *B32B 2307/732* (2013.01); *B32B 2555/02* (2013.01)

(56) References Cited

U.S. PATENT DOCUMENTS

| | | | |
|---|---|---|---|
| 5,702,798 | A | 12/1997 | Sugita et al. |
| 5,851,935 | A | 12/1998 | Srinivasan et al. |
| 6,124,001 | A | 9/2000 | Sugita et al. |
| 8,168,853 | B2 | 5/2012 | Autran et al. |
| 8,445,744 | B2 | 5/2013 | Autran et al. |
| 9,169,384 | B2 | 10/2015 | Autran et al. |
| 9,327,477 | B2 | 5/2016 | Muslet et al. |
| 9,469,091 | B2 | 10/2016 | Henke et al. |
| 9,669,606 | B2 | 6/2017 | Muslet et al. |
| 9,895,275 | B2 | 2/2018 | Autran et al. |
| 9,913,764 | B2 | 3/2018 | Thomas et al. |
| 10,500,107 | B2 | 12/2019 | Autran et al. |
| 10,632,027 | B2 | 4/2020 | Thomas et al. |
| 10,723,107 | B2 | 7/2020 | Uchida et al. |
| 10,772,984 | B2 | 9/2020 | Takeda et al. |
| 10,889,089 | B2 | 1/2021 | Takeda et al. |
| 2009/0258210 | A1 | 10/2009 | Iyad et al. |
| 2009/0264844 | A1 | 10/2009 | Autran et al. |
| 2010/0040826 | A1 | 2/2010 | Autran et al. |
| 2010/0240818 | A1* | 9/2010 | Walton ................. C08L 101/00 524/505 |
| 2012/0184169 | A1 | 7/2012 | Autran et al. |
| 2013/0237938 | A1 | 9/2013 | Autran et al. |
| 2014/0041786 | A1* | 2/2014 | Henke .................. B32B 37/144 156/164 |
| 2014/0045401 | A1* | 2/2014 | Kunihiro ............... B32B 27/12 442/381 |
| 2014/0242360 | A1 | 8/2014 | Muslet et al. |
| 2015/0164705 | A1 | 6/2015 | Thomas et al. |
| 2016/0015576 | A1 | 1/2016 | Autran, Jr. et al. |
| 2017/0157888 | A1 | 6/2017 | Ikishima et al. |
| 2017/0157901 | A1 | 6/2017 | Uchida et al. |
| 2017/0252228 | A1 | 9/2017 | Ikishima et al. |
| 2017/0313034 | A1 | 11/2017 | Takeda et al. |
| 2017/0320300 | A1 | 11/2017 | Takeda et al. |
| 2017/0320304 | A1 | 11/2017 | Takeda et al. |
| 2018/0127620 | A1 | 5/2018 | Uchida et al. |
| 2018/0133070 | A1 | 5/2018 | Thomas et al. |
| 2018/0133357 | A1 | 5/2018 | Takeda et al. |
| 2018/0133951 | A1 | 5/2018 | Takeda et al. |
| 2019/0291391 | A1 | 9/2019 | Takeda et al. |

FOREIGN PATENT DOCUMENTS

| | | |
|---|---|---|
| CN | 105828775 | 8/2016 |
| CN | 105848889 | 8/2016 |
| CN | 106029373 | 10/2016 |
| CN | 106660331 | 5/2017 |
| CN | 107000393 | 8/2017 |
| EP | 2 974 878 | 1/2016 |
| EP | 3 072 685 | 9/2016 |
| EP | 3 187 333 | 7/2017 |
| EP | 3 284 595 | 2/2018 |
| JP | H08-001840 | 1/1996 |
| JP | 10-46461 | 2/1998 |
| JP | 2011-514391 | 5/2011 |
| JP | 2016-112877 | 6/2016 |
| JP | 2016-204625 | 12/2016 |
| JP | 2016-204634 | 12/2016 |
| JP | 2018-103439 | 7/2018 |

OTHER PUBLICATIONS

Indian Office Action issued in Application No. 202117043250, dated Oct. 12, 2023.

International Search Report issued in Patent Application No. PCT/IB2020/053612, dated Jun. 18, 2020.

Japan, Notice of Reasons for Refusal received in Japanese Patent Application No. 2021-560942, dated Jun. 4, 2024.

* cited by examiner

CD direction

ELASTIC LAMINATE

TECHNICAL FIELD

The present invention relates to elastic laminate which is characterized by such elongation strength that it can be easily elongated, and an article including the same. Particularly, said elastic laminate should be usable as "elastic ear", i.e. as an elastic laminate between side tape (hook tape) and diaper, particularly when used for an open-type diaper.

BACKGROUND ART

Various elastic laminates having included multilayer co-extruded films are proposed for materials for articles such as sanitary articles, for example, diapers and masks (see, for example, Patent Literatures 1, 2 and 3).

Typically, an elastic laminate having a non-woven fabric layer on at least one side of an elastomer layer has been proposed. In such stretchable laminate, the elastomer layer and the non-woven fabric layer are generally bonded to each other with an adhesive or a pressure-sensitive adhesive. However, such related-art elastic laminates formed of two or more layers including an elastomer layer cannot be comfortably used as "elastic ear", i.e. as an elastic laminate between side tape (hook tape) and diaper, in case an elongation strength thereof is too high Further, it is important for such elastic laminate to have an excellent feeling of touch so as to be comfortably fitted to each of various users.

CITATION LIST

Patent Literature

[PTL 1] JP 2016-112877 A
[PTL 2] JP 2016-204625 A
[PTL 3] JP 2016-204634 A

SUMMARY OF INVENTION

Technical Problem

The present invention has been made to solve the problems of the related art, and an object of the present invention is to provide an elastic laminate having such elongation strength to be comfortably used as "elastic ear", i.e. as an elastic laminate between side tape (hook tape) and diaper. Another object of the present invention is to provide an article including such elastic laminate.

Solution to Problem

[1] An elastic laminate according to one embodiment of the present invention is an elastic laminate comprising
a multilayer film comprising at least two first elasticity skin layers and at least one second elasticity core layer, the first elasticity skin layers arranged on both sides of the at least one second elasticity core layer, said second elasticity core layer having higher elasticity than the sandwiching first elasticity skin layers, wherein the first elasticity skin layers comprise an olefin polymer, and the second elasticity core layer comprise an elastomer layer, and
said multilayer film having arranged on both outer surfaces thereof non-woven layers bonded either (i) through hotmelt pressure-sensitive adhesive layers or (ii) by means of ultrasonic bonding or thermal bonding, wherein the elastic laminate is characterized by an elongation strength of less than 20 N/50 mm width when elongated by 50% with 300 mm/min elongation speed,
wherein the total film thickness of the multilayer film is in the range of 26 to 60 µm,
the ratio of the total thickness of the first elasticity layers to the total thicknesses of the second elasticity core layer(s) is in the range of 1:10 to 1:25,
wherein the non-woven fabric layers are selected from spunbonded non-woven or carded non-woven, and
wherein predetermined parts of the elastic laminate have been subjected to an extension treatment, wherein the fiber structure of the non-woven fabric layers on said predetermined parts of the elastic laminate is mechanically loosened.

[2] An elastic laminate according to another embodiment of the present invention is an elastic laminate comprising
a multilayer film comprising at least two first elasticity skin layers and at least one second elasticity core layer, the first elasticity skin layers arranged on both sides of the at least one second elasticity core layer, said second elasticity core layer having higher elasticity than the sandwiching first elasticity skin layers, wherein the first elasticity skin layers comprise an olefin polymer, and the second elasticity core layer comprise an elastomer layer, and
said multilayer film having arranged on both outer surfaces thereof non-woven layers bonded either (i) through hotmelt pressure-sensitive adhesive layers or (ii) by means of ultrasonic bonding or thermal bonding,
wherein the elastic laminate is characterized by an elongation strength of less than 20 N/50 mm width when elongated by 50% with 300 mm/min elongation speed,
wherein the total film thickness of the multilayer film is in the range of 26 to 60 µm,
the ratio of the total thickness of the first elasticity layers to the total thicknesses of the second elasticity core layer(s) is in the range of 1:10 to 1:25, and
wherein the non-woven fabric layers are selected from spunlace non-woven.

The elastic laminate of the present invention, when used as "elastic ear", i.e. as an elastic laminate between side tape (hook tape) and diaper, exhibits "easy wearing" characteristics, particularly when used for an open-type diaper.

The present invention further provides is a process for producing the elastic laminate according to [1], comprising
directly bonding the at least one second elasticity core layer and the at least two first elasticity skin layers with each other to provide a multilayer film,
bonding a non-woven fabric on both outer surfaces of the multilayer film either (i) through hotmelt pressure-sensitive adhesive or (ii) by means of ultrasonic bonding or thermal bonding to provide an elastic laminate, and
subjecting predetermined parts of the elastic laminate to an extension treatment, wherein the fiber structure of the non-woven fabric layers on said predetermined parts of the elastic laminate is mechanically loosened.

Furthermore, the present invention provides a process for producing the elastic laminate according to [2], comprising
directly bonding the at least one second elasticity core layer and the at least two first elasticity skin layers with each other to provide a multilayer film,
bonding a non-woven fabric on both outer surfaces of the multilayer film either (i) through hotmelt pressure-sensitive adhesive or (ii) by means of ultrasonic bonding or thermal bonding to provide an elastic laminate.

An article according to the present invention includes an elastic laminate according to the present invention.

DESCRIPTION OF EMBODIMENTS

Figure 1:
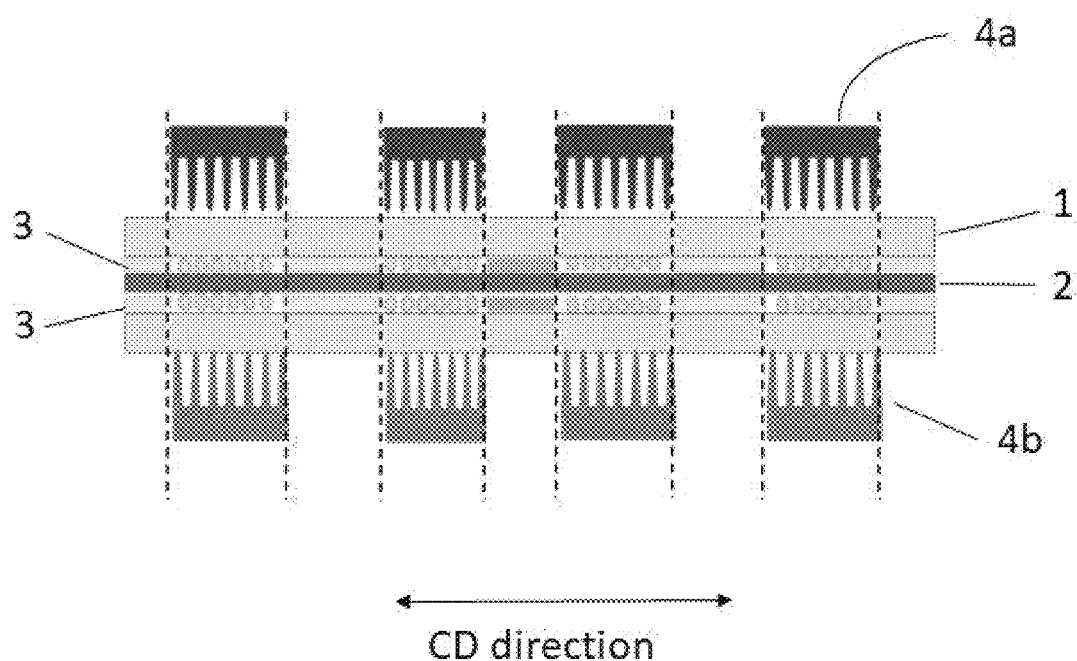
FIG. 1 is a schematic view of the ring rolls used in the activation treatment on one embodiment of the elastic laminate of the present invention.

The elastic laminate according to the present invention comprises a multilayer film comprising first elasticity skin layers arranged on both sides of a second elasticity core layer, said second elasticity core layer having higher elasticity than the sandwiching first elasticity skin layers, wherein the first elasticity skin layers comprise an olefin polymer, and the second elasticity core layer comprise an elastomer layer.

According to the invention, the elastic laminate is characterized by an elongation strength of less than 20 N/50 mm width when elongated by 50% with 300 mm/min elongation speed. Thus, herein, elongation strength means the force when the laminate is elongated from the original length (100%) to 150% length of the original. When the "force at 50% elongation" as later used herein is small, this means that the laminate can be elongated easily.

Further, the elastic laminate of the present invention according to above [1] or [2], particularly [2], preferably has a tension strength at elongation by 50%, also called herein as the initial inclination, determined by a wearable contact force sensor HapLog Haptic Skill Logger produced by KATO TECH Co., Ltd. of 0.15 N/mm or less, as described in detail in the examples. The lower the value of the initial inclination is, the easier it is to elongate the laminate.

<<First Elasticity Skin Layers>>

According to the invention, the first elasticity skin layers comprise an olefin polymer. In particular, the olefin polymer can include a propylene/ethylene copolymer, in particular primarily composed of isotactic propylene repeating units with random ethylene distribution. Preferably, the first elasticity skin layers comprise a combination of an olefin-based elastomer and a crystalline olefin polymer. More preferably, the content of said olefin-based elastomer in the first elasticity skin layers is preferably 25 wt % or more, more preferably 30 wt % or more, even more preferably 40 wt % or more, and particularly preferably 50 wt % or more. The content of said olefin-based elastomer in the first elasticity skin layers is preferably 75 wt % or less, more preferably 70 wt % or less, even more preferably 60 wt % or less, and particularly preferably 50 wt % or less. The content of said crystalline olefin polymer in the first elasticity skin layers is preferably 25 wt % or more, more preferably 30 wt % or more, even more preferably 40 wt % or more, and particularly preferably 50 wt % or more. The content of said crystalline olefin polymer in the first elasticity skin layers is preferably 75 wt % or less, more preferably 70 wt % or less, even more preferably 60 wt % or less, and particularly preferably 50 wt % or less. This blending ratio is the result of achieving satisfactory property balance of elasticity, anti-blocking property and slitting performance. In particular, if the content of said crystalline olefin polymer in the first elasticity layers is less than 25 wt %, anti-blocking property will not be sufficient. By higher blending ratio towards said crystalline olefin polymer, anti-blocking and slitting properties become better. However, elasticity is getting worse. By higher blending ratio towards said olefin-based elastomer, elasticity becomes better. On the other hand, film surface becomes sticky, so that it is difficult to slit and unwind the film roll.

As the olefin-based elastomer, any appropriate olefin-based elastomer may be adopted to the extent that the effects of the present invention are not impaired. Examples of such olefin-based elastomer include an α-olefin-based elastomer, an olefin block copolymer, an olefin random copolymer, an ethylene copolymer, a propylene copolymer, an ethylene olefin block copolymer, a propylene olefin block copolymer, an ethylene olefin random copolymer, a propylene olefin random copolymer, an ethylene propylene random copolymer, an ethylene(1-butene) random copolymer, an ethylene(1-pentene) olefin block copolymer, an ethylene(1-hexene) random copolymer, an ethylene(1-heptene)olefin block copolymer, an ethylene(1-octene)olefin block copolymer, an ethylene(1-nonene)olefin block copolymer, an ethylene(1-decene)olefin block copolymer, a propylene ethylene olefin block copolymer, an ethylene(α-olefin) copolymer, an ethylene(α-olefin) random copolymer, an ethylene(α-olefin) block copolymer, and combinations thereof. Of those, from the viewpoint of enabling the effects of the present invention to be further exhibited, an α-olefin-based elastomer is preferred. The number of kinds of the olefin-based elastomers may be only one, or may be two or more.

A preferred example of the α-olefin-based elastomer is at least one kind selected from an ethylene based elastomer, a propylene-based elastomer, and a 1-butene-based elastomer.

The α-olefin-based elastomer is also available as a commercial product. Examples of such commercial product include some products in the "VISTAMAXX" (trademark) series (such as VISTAMAXX 3980, VISTAMAXX 6102, and VISTAMAXX 3000) manufactured by ExxonMobil Corporation, and some products in the "TAFMER" (trademark) series (such as TAFMER PN-3560) manufactured by Mitsui Chemicals, Inc.

As crystalline olefin polymer, any appropriate crystalline olefin polymer may be adopted to the extent that the effects of the present invention are not impaired. A preferred example of such crystalline olefin polymer is at least one kind selected from HDPE, r-PP, or LDPE. Such crystalline olefin polymers are commercially available, for example 52518 HDPE sold by National Petrochemical Company, Iran Petrochemical Commercial Company, PP756C (r-PP) sold by Thai Polypropylene Co., Ltd, under the trademark EL-Pro™], or G03-21T LDPE sold by Petkim under the trademark PETILEN.

The thickness of each first elasticity skin layer is preferably 0.5 μm or more, more preferably 1 μm or more, still more preferably 1.5 μm or more, and preferably 10 μm or less, more preferably 7 μm or less, still more preferably 5 μm or less, or 3 μm or less. For example, the thickness of each first elasticity skin layer is preferably in a range of 1 to 10 μm, more preferably in a range of 2 to 5 μm. When the thickness of the first elasticity skin layer falls within such range, a multilayer film with superior elasticity can be provided. The thickness of the first elasticity skin layers arranged on both sides of the second elasticity core layer can be the same or different.

The thickness ratio of first elasticity skin layer to second elasticity core layer may affect residual strain and film productivity. The ratio of the total thickness of the first elasticity skin layers to the total thickness of the second elasticity core layer(s) is in the range of 1:10 to 1:25, preferably in the range of 1:10 to 1:15. The total thickness of the first elasticity skin layers refers to the sum of the thicknesses of all the first elasticity skin layers included in the elastic laminate. The total thickness of the second elasticity core layer(s) refers to the sum of the thicknesses of all the second elasticity core layers included in the elastic laminate.

<<Second Elasticity Core Layer>>

According to the present invention, the second elasticity core layer comprises an elastomer layer, said elastomer layer having higher elasticity than the sandwiching first elasticity skin layers. In a preferred embodiment, the second elasticity core layer consists of the elastomer layer. Preferably, the second elasticity core layer comprises a combination of at least two kinds of styrene-based elastomers (a) and (b), for example SIS-based elastomers or SBS-based elastomers, which differ in the styrene content in that the styrene-based elastomer (a) has a styrene content in the range of 30 to 60 wt % ("hard styrene-based elastomer"), while the styrene-based elastomer (b) has a styrene content in the range of 10 to 29 wt % ("soft styrene-based elastomer"), wherein the contents of the styrene-based elastomers (a) and (b) in said second elasticity core layer are in the range of 35 to 60 wt % each (but in total not exceeding 100 wt %).

For styrene based material, particularly SIS material, high styrene content material provides better elasticity. However, film forming becomes more difficult because of high melt viscosity, where in particular thickness fluctuation in machine direction can occur. Therefore, in accordance with the present invention, high styrene content grade and low one are blended in order to adjust melt viscosity for appropriate film forming, but concurrently gaining better elasticity. By adopting the at least two kinds of styrene-based elastomers (a) and (b), particularly SIS-based elastomers (a) and (b), differing in the styrene content, an excellent balance of productivity and film property can be achieved.

As the styrene-based elastomer, any appropriate styrene-based elastomer, such as an SIS-based elastomer or an SBS-based elastomer, may be adopted. Such styrene-based elastomer is preferably an SIS-based elastomer having a particular molecular structure from the viewpoint of enabling the effects of the present invention to be further exhibited. Specifically, the SIS-based elastomer is an SIS-based elastomer including a styrene-isoprene-styrene block copolymer molecular structure having different terminal styrene block chain lengths (hereinafter sometimes referred to as "particular SIS-based elastomer") and is discriminated from a conventional SIS-based elastomer.

Regarding the hard styrene-based elastomer (a), the lower limit of the styrene content is 30 wt % or more, preferably 32 wt % or more, and more preferably 34 wt % or more. The upper limit of the styrene content is 60 wt % or less, preferably 55 wt % or less, and more preferably 50 wt % or less.

Regarding the soft styrene-based elastomer (b), the lower limit of the styrene content is 10 wt % or more, preferably 12 wt % or more, and more preferably 14 wt % or more. The upper limit of the styrene content is 29 wt % or less, preferably 25 wt % or less, and more preferably 21 wt % or less.

As far as the percentage of the hard styrene-based elastomer (a) in the second elasticity core layer is concerned, a lower limit may be 35 wt % or more, preferably 37 wt % or more, more preferably 39 wt % or more. The upper limit of the percentage of the hard styrene-based elastomer (a) in the second elasticity core layer may be 60 wt % or less, preferably 57 wt % or less, more preferably 54 wt % or less.

The number of the second elasticity core layer may be one, or may be two or more. The number of the second elasticity core layer is preferably one.

Moreover, the elastic laminate of the present invention preferably comprises one multilayer film.

The multilayer film preferably has the layer arrangement A/B/A (A=first elasticity skin layer, B=second elasticity core layer).

In a further preferred embodiment, the styrene-based elastomer (a) has a di-block content of less than 5%, more preferably less than 3%, even more preferably less than 1%, while the styrene-based elastomer (b) has a di-block content in the range of 10 to 20%, more preferably 10 to 15%, as measured by HPLC. For example, the following conditions can be used: equipment: HPLC-8320 produced by TOSOH Corporation; columns: KF-404HQ×3 produced by Shodex; solvent: THF; rate: 0.35 ml/min; temp: 40° C.

Examples of the styrene-based elastomers (a) and (b) used in the present invention include products with the trade names "Quintac 3390" (styrene content=48 wt %), "Quintac SL-190" (styrene content=35 wt %), "Quintac SL-188" (styrene content=30 wt %), "Quintac 3191" (styrene content=44 wt %), "Quintac 3620" (styrene content=14 wt %), or "Quintac SL-189" (styrene content=18 wt %) manufactured by Zeon Corporation.

In the present invention, the styrene-based elastomer (a), i.e. the above "hard styrene-based elastomer", has a melt index MI of preferably from 10 g/10 min to 20.0 g/10 min measured at 200° C./5 kg, as measured in accordance with JIS K 7210, while the above "soft styrene-based elastomer" (b) has a MI of preferably from 5 g/10 min to 10.0 g/10 min measured at 200° C./5 kg as measured in accordance with JIS K 7210. When the particular SIS-based elastomers whose MI fall within the range described above are adopted, a multilayer film which has a sufficient holding ability in the case of being stretched to be bonded onto another material, particularly non-woven fabric layers through hotmelt pressure-sensitive adhesive layers or by means of ultrasonic bonding or thermal bonding, and is more excellent in feeling of touch, can be provided. As mentioned above, the contents of styrene-based elastomer (a) and styrene-based elastomer (b) in the second elasticity core layer are in the range of 35 to 60 wt % each, preferably in the range of 40 to 55 wt %, more preferably 45 to 50 wt %.

Apart from the at least two kinds of styrene-based elastomers (a) and (b), the second elasticity core layer may further contain any appropriate other component to the extent that the effects of the present invention are not impaired. Examples of such other component include any other polymer, a tackifier, a plasticizer, an antidegradant, any other pigment, a dye, an antioxidant, an antistatic agent, a lubricant, a blowing agent, a heat stabilizer, a light stabilizer, an inorganic filler, and an organic filler. The number of kinds of those components may be only one, or maybe two or more. The content of the other component in the second elasticity core layer is preferably 10 wt % or less, more preferably 7 wt % or less, still more preferably 5 wt % or less, particularly preferably 2 wt % or less, more particularly preferably 1 wt % or less.

In an embodiment of the present invention, the second elasticity core layer may contain a $TiO_2$/LDPE masterbatch (c) in the range of 5 to 10 wt %. Preferably, a mass ratio of the total amount of TiO$_2$ to the total amount of LDPE in said masterbatch is 50/50 to 80/20, more preferably 70/30. TiO$_2$ as white pigment is preferred by customers for hygiene products. Such TiO$_2$/LDPE masterbatches are commercially available.

In a further embodiment of the present invention, the multilayer film does not contain any anti-blocking agent or inorganic particles, except the TiO$_2$ in the TiO$_2$/LDPE masterbatch (c).

The thickness of the second elasticity core layer is preferably 25 µm or more, more preferably 30 µm or more, still more preferably 35 µm or more, and preferably 55 µm or less, more preferably 50 µm or less, still more preferably 45 µm or less. When the thickness of the second elasticity core layer falls within such range, a multilayer film with superior elasticity can be provided.

In a preferred embodiment, the total film thickness of the multilayer film is in the range of 26 to 60 µm, preferably 30 to 55 µm, more preferably 35 to 50 µm.

The main function of the first elasticity skin layers is to provide anti-blocking property, particularly when roll winding takes place. For that purpose, these layers should exhibit low elasticity. To the contrary, the second elasticity core layer should exhibit high elasticity. The thinner the first elasticity skin layers are, the higher the elasticity of the multilayer film and thus, of the elastic laminate. However, then, film production will be getting worse due to deteriorated extrusion performance. Accordingly, for such layer arrangement A/B/A (A=first elasticity skin layer, B=second elasticity core layer), an appropriate layer ratio can be A/B/A=2.5 to 5%/90 to 95%/2.5 to 5% in terms of thickness.

In an embodiment of the present invention, said multilayer film has arranged thereon hot-melt pressure-sensitive adhesive layers applied on both sides of the multilayer film to bond the outer non-woven layers. As the hot-melt pressure-sensitive adhesive any appropriate hot-melt pressure-sensitive adhesive may be adopted. The number of kinds of the hot-melt pressure-sensitive adhesives may be only one, or maybe two or more. Examples of such hot-melt pressure-sensitive adhesive include a hot-melt pressure-sensitive adhesive containing a styrene-based elastomer and a hot-melt pressure sensitive adhesive containing an olefin-based polymer. Of those, as the hot-melt pressure-sensitive adhesive, the hot-melt pressure-sensitive adhesive containing a styrene-based polymer is preferred from the viewpoint of enabling the effects of the present invention to be further exhibited. Examples of such styrene-based polymer include a styrene-based polymer containing SIS, a styrene-based polymer containing SBS, hydrogenated products thereof, and blends thereof. When the hot-melt pressure-sensitive adhesive contains a styrene-based polymer, the content of the styrene-based polymer in the hot-melt pressure-sensitive adhesive is preferably from 10 wt % to 90 wt %, more preferably from 20 wt % to 80 wt %, still more preferably from 30 wt % to 70 wt %, particularly preferably from 40 wt % to 60 wt % from the viewpoint of enabling the effects of the present invention to be further exhibited.

Examples of the olefin-based polymer include: a polyolefin resin, such as an olefin-based elastomer, a 1-butene copolymer, amorphous poly-α-olefin, a propylene-based polymer, polyethylene, or an olefin-based thermoplastic elastomer (TPO), and modified products thereof; a copolymer of an α-olefin with a vinyl compound (for example, vinyl acetate or a (meth)acrylic acid ester); polyamide; polyester; polycarbonate; polyurethane; and polyvinyl chloride. Examples of the propylene-based polymer include homopolypropylene, block polypropylene, and random polypropylene. Of those, from the viewpoint of enabling the effects of the present invention to be further exhibited, an olefin-based elastomer, a 1-butene copolymer, or amorphous poly-α-olefin is preferred, a 1-butene copolymer is more preferred, and a propylene/1-butene copolymer described below is still more preferred.

As the olefin-based elastomer, any appropriate olefin-based elastomer may be adopted to the extent that the effects of the present invention are not impaired. Examples of such olefin-based elastomer include an α-olefin-based elastomer, an olefin block copolymer, an olefin random copolymer, an ethylene copolymer, a propylene copolymer, an ethylene olefin block copolymer, a propylene olefin block copolymer, an ethylene olefin random copolymer, a propylene olefin random copolymer, an ethylene propylene random copolymer, an ethylene(1-butene) random copolymer, an ethylene (1-pentene) olefin block copolymer, an ethylene(1-hexene) random copolymer, an ethylene(1-heptene)olefin block copolymer, an ethylene(1-octene)olefin block copolymer, an ethylene(1-nonene)olefin block copolymer, an ethylene(1-decene)olefin block copolymer, a propylene ethylene olefin block copolymer, an ethylene(α-olefin) copolymer, an ethylene(α-olefin) random copolymer, an ethylene(α-olefin) block copolymer, and combinations thereof. Of those, from the viewpoint of enabling the effects of the present invention to be further exhibited, an α-olefin-based elastomer is preferred. The number of kinds of the olefin-based elastomers may be only one, or may be two or more.

A preferred example of the α-olefin-based elastomer is at least one kind selected from an ethylene based elastomer, a propylene-based elastomer, and a 1-butene-based elastomer.

The α-olefin-based elastomer is also available as a commercial product. Examples of such commercial product include some products in the "TAFMER" (trademark) series (such as TAFMER PN-3560) manufactured by Mitsui Chemicals, Inc., some products in the "VISTAMAXX" (trademark) series (such as VISTAMAXX 3000, VISTAMAXX 6202, VISTAMAXX 7010, and VISTAMAXX 7050) manufactured by ExxonMobil Corporation, some products in the "REXtac" (trademark) series (such as REXTAC RT2780 and REXTAC RT2788) manufactured by REXtac, LLC, and products in the TAFTHREN series (such as T3712 and T3522) manufactured by Sumitomo Chemical Co., Ltd.

In addition, as the olefin-based hot-melt pressure-sensitive adhesive, a product with the trade name "AC600" manufactured by Bento Bantçilik may also be used.

As the 1-butene copolymer, any appropriate 1-butene copolymer maybe adopted to the extent that the effects of the present invention are not impaired. Examples of such 1-butene copolymer include an ethylene/1-butene copolymer and a propylene/1-butene copolymer. Of those, a propylene/1-butene copolymer is preferred from the viewpoint of enabling the effects of the present invention to be further exhibited. The number of kinds of the 1-butene copolymers may be only one, or may be two or more.

The 1-butene copolymer is also available as a commercial product. Examples of such commercial product include some products in the "Rextac" (trademark) series (such as REXTAC RT2780 and REXTAC RT2788) manufactured by REXtac, LLC.

The hot-melt pressure-sensitive adhesive may contain any appropriate other component to the extent that the effects of the present invention are not impaired. Examples of such other component include liquid paraffin, a tackifier, an antioxidant, a UV absorber, a light stabilizer, and a fluorescence agent. The number of kinds of such other components may be only one, or may be two or more.

A tackifier is effective for improving a pressure-sensitive adhesive strength. When the hot-melt pressure-sensitive adhesive contains the tackifier, the content of the tackifier in the hot-melt pressure-sensitive adhesive is preferably from 10 wt % to 90 wt %, more preferably from 20 wt % to 80 wt %, still more preferably from 30 wt % to 70 wt %, particularly preferably from 40 wt % to 60 wt % from the viewpoint of enabling the effects of the present invention to be further exhibited.

Examples of the tackifier include a hydrocarbon-based tackifier, a terpene-based tackifier, a rosin-based tackifier, a phenol-based tackifier, an epoxy-based tackifier a polyamide-based tackifier, an elastomer-based tackifier, and a ketone-based tackifier. The number of kinds of the tackifiers may be only one, or may be two or more.

Examples of the hydrocarbon-based tackifier include an aliphatic hydrocarbon resin, an aromatic hydrocarbon resin (such as a xylene resin), an aliphatic cyclic hydrocarbon resin, an aliphatic aromatic petroleum resin (such as a styrene-olefin copolymer), an aliphatic alicyclic petroleum resin, a hydrogenated hydrocarbon resin, a coumarone-based resin, and a coumarone-indene-based resin.

Examples of the terpene-based tackifier include: a terpene based resin, such as an α-pinene polymer or a β-pinene polymer; and a modified terpene-based resin which is obtained through modification of a terpene-based resin (for example, through phenol modification, aromatic modification, or hydrogenation modification) (such as a terpene-phenol-based resin, a styrene-modified terpene-based resin, or a hydrogenated terpene-based resin).

Examples of the rosin-based tackifier include: an unmodified rosin (raw rosin), such as gum rosin or wood rosin; a modified rosin which is obtained by modifying an unmodified rosin by hydrogenation, disproportionation, polymerization, or the like (such as a hydrogenated rosin, a disproportionated rosin, a polymerized rosin, or other chemically modified rosins); and other rosin derivatives.

An example of the phenol-based tackifier is a resol-type or novolac-type alkylphenol.

The tackifier may be a product commercially available as a blend with an olefin resin or a thermoplastic elastomer.

In another embodiment of the present invention, the outer non-woven layers are provided on said multilayer film by means of ultrasonic (welding) bonding or thermal bonding, particularly ultrasonic bonding. When the multilayer film and non-woven layers are directly fused and bonded to each other by ultrasonic (welding) bonding, the elastic laminate of the present invention has the following features: the delamination more hardly occurs between the multilayer film and the non-woven layers adjacent thereto; the occurrence of the unique odor derived from the pressure-sensitive adhesive is further suppressed; the inhibition of the air permeability due to the bonding of the multilayer film and the non-woven layers adjacent thereto can be further prevented; and the laminate can be produced at even lower cost than ever before.

Any appropriate ultrasonic welding bonding may be adopted as the ultrasonic welding bonding to the extent that the effects of the present invention are not impaired. In the ultrasonic welding bonding, members to be bonded are arranged between a part generally referred to as "horn", the part being configured to feed vibration energy with an ultrasonic wave, and a roll-shaped part generally referred to as "anvil". In many cases, the horn is arranged vertically above the members to be bonded and the anvil. The horn typically vibrates at from 20,000 Hz to 40,000 Hz to transfer energy typically in the form of frictional heat to the members to be bonded under pressure. Part of at least one of the members to be bonded is softened or melted by the frictional heat and the pressure, and hence the materials are bonded to each other. One preferred kind of ultrasonic welding bonding is generally known as "continuous ultrasonic welding bonding". The continuous ultrasonic welding bonding is typically used for sealing members to be bonded that can be supplied into a bonding apparatus in a substantially continuous manner. In the continuous ultrasonic welding bonding, the horn is typically fixed and the members to be bonded move directly below the horn. In one kind of continuous ultrasonic welding bonding, the fixed horn and a rotating anvil surface are used. During the continuous ultrasonic welding bonding, the members to be bonded are pulled between the horn and the rotating anvil. The horn typically extends in its lengthwise direction toward the members to be bonded, and its vibration moves along the horn in its axial direction to the materials. In another preferred kind of ultrasonic welding bonding, the horn is a rotation type, has a cylindrical shape, and rotates about its lengthwise direction axis. Input vibration is present in the axial direction of the horn and output vibration is present in the radial direction of the horn. The horn is arranged so as to be close to the anvil, and the anvil can also typically rotate so that the members to be bonded may pass a space between cylindrical surfaces at a line velocity substantially equal to the tangential velocity of the cylindrical surfaces. The ultrasonic welding bonding is disclosed in, for example, JP 2008-526552 A, JP 2010-195044 A, JP 2013-231249 A, JP 2015-16294 A, and U.S. Pat. No. 5,976,316 A, and the contents of the disclosures are incorporated herein by reference.

Any appropriate non-woven fabric layer may be adopted as the non-woven fabric layer as long as the effects of the present invention are not impaired. The number of kinds of non-woven fabrics constituting the non-woven fabric layer may be only one, or maybe two or more. In a preferred embodiment, the woven fabric layers arranged on both outer sides of the multilayer film through said hotmelt pressure-sensitive adhesive layers or by means of ultrasonic bonding or thermal bonding, are selected from spunbonded non-woven, spunlace non-woven, and carded non-woven. For example, the non-woven fabric constituting the non-woven fabric layer may contain fibers of polypropylene, polyethylene, polyester, polyamide, polyurethane, an elastomer, rayon, cellulose, acrylic, a copolymer thereof, or a blend thereof, or a mixture thereof, or any other polyolefin. The non-woven fabric preferably contains fibers of polyolefin, such as polypropylene or polyethylene, out of those fibers because the effects of the present invention can be expressed to a larger extent. The non-woven fabric constituting the non-woven fabric layer may contain fibers as a homogeneous structural body, or may contain a bicomponent structural body, such as a sheath/core structure, a side-by-side structure, a sea-island structure, and any other bicomponent structure. Detailed descriptions of the non-woven fabric may be found in, for example, "Nonwoven Fabric Primer and Reference Sampler", E. A. Vaughn, Association of the Nonwoven Fabrics Industry, third edition (1992).

The grammage of the non-woven fabric constituting the non-woven fabric layers is preferably 150 gsm or less, more preferably 100 gsm or less, still more preferably 50 gsm or less, particularly preferably from 10 gsm to 30 gsm.

In a further embodiment of the present invention, there is provided an elastic laminate comprising
a multilayer film comprising at least two different elasticity layers with at least one first elasticity layer and at least one second elasticity layer having higher elasticity than the at least one first elasticity layer, wherein
the first elasticity layer comprises a combination of an olefin-based elastomer and a crystalline olefin polymer, wherein the content of said olefin-based elastomer in the first elasticity layer is in the range of 30 to 80 wt %, and the content of said crystalline olefin polymer in the first elasticity layer is in the range of 20 to 70 wt %, and
the second elasticity layer comprises a combination of at least two kinds of styrene-based elastomers (a) and (b), which differ in the styrene content in that the styrene-based elastomer (a) has a styrene content in the range of 30 to 60 wt %, while the styrene-based elastomer (b) has a styrene content in the range of 10 to 29 wt %, wherein the contents of the styrene-based elastomers (a) and (b) in said second elasticity layer are in the range of 35 to 60 wt % each,
said multilayer film having arranged on both outer surfaces thereof non-woven layers bonded either (i) through hotmelt pressure-sensitive adhesive layers or (ii) by means of ultrasonic bonding or thermal bonding.

Regarding this embodiment, all the statements already made above also apply to the elastic laminate according to this aspect.

<<Production of the Elastic Laminate>>

In production of the multilayer film used in the present invention, the second elasticity core layer and the first elasticity layers are directly bonded with each other. Examples of such bonding method include a method involving laminating a first elasticity layer and a second elasticity layer by T-die co-extrusion or inflation co-extrusion.

Non-woven layers selected from spunbonded non-woven, carded non-woven and spunlace non-woven are bonded on both outer surfaces of the multilayer film using hot-melt pressure-sensitive adhesive as described above or by means of ultrasonic (welding) bonding or thermal bonding as described above.

The hot-melt pressure-sensitive adhesive is preferably applied on the multilayer film in multiple strips.

Thermal bonding is carried out by applying heat to a part or whole of the elastic laminate.

The elastic laminate of the present invention is subjected to treatments referred to as activation treatment or extension treatment after laminating the multilayer film and the non-woven fabric layers selected from spunbonded and carded non-woven as it is known in the prior art such as WO 95/12488 and US 2017/0296399 which are herein incorporated by reference. When spunlace non-woven is used as the non-woven fabric layers, the activation treatment is optional. The elongation strength characteristics of the elastic laminate is improved by the activation treatment.

The activation treatment is carried out by subjecting the elastic laminate between multiple pairs of running ring rolls or intermeshing corrugated rolls, thereby "activating" or stretching/extending the elastic laminate. The intermeshing ring rolls are schematically shown as 4a and 4b in FIG. 1. Preferably, the activation treatment is performed on the parts of the elastic laminate where the above-mentioned hot-melt pressure-sensitive adhesive has been applied, where the ultrasonic wave has been applied, or where the heat has been applied during the thermal bonding. Preferably, the activation/extension treatment is performed in a width direction (i.e. CD direction) of the elastic laminate, i.e. the elastic laminate is run in the MD direction perpendicular to the width direction, between the multiple ring rolls, thereby imparting elasticity in the CD direction. The width direction or the cross direction (CD direction) herein means the direction perpendicular to the machine direction (MD direction). The MD direction means the direction in which the multilayer film is extruded. In the activation/extension treatment, a fiber structure of a part of the region of the non-woven fabric layer is mechanically loosened or ravelled, respectively, thereby increasing the elasticity of the elastic laminate. When such treatments are performed, the elastic laminate can be elongated by a smaller force. The activation/extension treatment may be performed once or twice or more than twice. Preferably, the activation treatment is performed twice. Although the elastic laminate is stretched during the activation treatment, the length of the elastic laminate returns to the original length after the activation treatment, since the first elasticity skin layers and the second elasticity core layers remain substantially undamaged during the activation process. As a result, the non-woven in the elastic laminate is gathered in those areas where activation has been carried out.

The activation ratio [%] is a reference of how much the elastic laminate has been extended by the ring rolls and is calculated as described in the examples. The activation ratio [%] is preferably from 150% to 300%.

For example, in order to control stretch direction, as the activation/extension treatment, the multi-layer film can be stretched in a first direction at a temperature of 140 to 155° C. in a ratio of the original length to the stretched length of 1:1.5 to 1:10, and subsequently cooled to room temperature so that the film can be stretched in the stretching direction perpendicular to the first direction and remain stiff in the first stretching direction. The first stretching direction may be the CD direction or the MD direction.

In order to further improve stretch and relax properties, the elastic laminate can be stretched before subjecting the film to the activation treatment, by using a diverging disks stretching device so that the film can be stretched in a cross direction (CD direction/width direction), for example, to the length of 110 to 500% of the original length.

In case of using spunlace non-wovens for the outer layers, the activation treatment is optional to achieve an elongation strength characteristic of less than 20 N/50 mm width when elongated by 50% with 300 mm/min elongation speed. The reason for that is that spunlace non-wovens are rather soft when compared to spunbonded non-wovens or carded non-wovens. The combination of using spunlace non-wovens together with such activation treatment makes the elastic laminate softer. Spunbonded non-wovens or carded nonwovens are harder non-wovens due to their point-bonded structure. Therefore, in those embodiments with spunbonded non-wovens or carded non-wovens, such activation treatment advantageously affects the elongation strength characteristic.

<<Application of the Elastic Laminate>>

The elastic laminate of the present invention can be used in any appropriate article in which the effects of the present invention can be effectively utilized. That is, the article of the present invention includes an elastic laminate of the present invention. A typical example of such article is a sanitary article. Examples of such sanitary article include a diaper (particularly an ear portion of a disposal diaper).

EXAMPLES

The present invention is hereinafter specifically described by way of Examples and Comparative Examples. However, the present invention is by no means limited by these Examples. In the Examples and Comparative Examples, test and evaluation methods are as described below. In addition, "part(s)" means "part(s) by weight" and "%" means "wt %" unless otherwise stated.

Example 1

A formulation of 50 wt % of a α-olefin-based elastomer resin (manufactured by ExxonMobil, trade name: VISTAMAXX 3980) and 50 wt % of a crystalline olefin polymer resin (manufactured by National Petrochemical Company, Iran Petrochemical Commercial Company, trade name: 52518) was loaded into A layer, and a formulation of 46.5 wt % of a SIS-based elastomer resin (manufactured by Zeon Corporation, trade name: Quintac 3390, styrene content=48 wt %, MFR=14.0 g/10 min) and 46.5 wt % of a SIS-based elastomer resin (manufactured by Zeon Corporation, trade name: Quintac 3620, styrene content=14 wt %, Di-block content=12 wt %, MFR=9.0 g/10 min) and 7 wt % of a $TiO_2$/LDPE masterbatch (Titanium oxide, manufactured by Ampacet, trade name: White PE MB 111413) was loaded into B layer in an extrusion machine to extrude an elastic multilayer film having the construction of A layer/B layer/A layer=2 μm/46 μm/2 μm in total of 50 μm. The results are shown in Table 1.

Subsequently, either hotmelt pressure-sensitive adhesive layers were applied on the multilayer film (cf. Examples 1 to 9 and Comparative Examples 1 to 7) or the multilayer film was subjected to ultrasonic bonding or heat bonding (cf. Examples 10-18) to bond non-woven fabric layers.

As material for the adhesive coating (hotmelt pressure-sensitive adhesive layers), commonly used hotmelt pressure-sensitive adhesive were used.

The laminate thus obtained was subjected to activation treatment. The activation treatment was performed once in the CD direction for each laminate. The laminate was activated/extended by running the laminate in the MD direction between multiple pairs of running ring rolls, each pair (4a, 4b) facing each other from both sides of the laminate as schematically shown in FIG. 1, thereby activating/extending the laminate in the CD direction. The activation ratio [%] is an approximation of (the width of the activated area after activation in the CD direction before the activated area returns to the original length/the width of the area to be activated before activation in the CD direction)× 100 and can be calculated by the software Autodesk AutoCAD (Autodesk Inc.) based on the thickness of each ring, the distance between adjacent rings, and the distance between the tips of the intermeshing rolls. The activation ratio can easily be adjusted by a person skilled in the art by suitably selecting the distance (depth) between the tips of the facing ring rolls 4a and 4b. The activation ratio of each Example is shown in Table 1. The activation ratio of 0 means that the activation was not performed.

In Table 1, laminated ratio of activation area [%] of Examples 1 to 3, 5 to 9, 13 to 18 and Comparative Examples 5 and 6 means the percentage of the area of the laminate on which hotmelt pressure-sensitive adhesive was applied or ultrasonic wave was applied with respect to the area of the laminate subjected to activation treatment. In Example 4 and Comparative Examples 2 to 4 and 7, although activation treatment was not carried out, the laminated ratio of activation area is indicated as 42%, meaning that the adhesive was coated in the same manner as in Example 2. Further, in Examples 10 to 12, although activation treatment was not carried out, the laminated ratio of activation area is indicated as 8%, meaning that ultrasonic wave (Examples 10 and 11) or heat (Example 12) was applied in the same manner as in Example 13. In Comparative Example 1, the adhesive was coated in the same manner as in Example 1.

The other examples/comparative examples shown in Table 1 below were produced in essentially the same manner as Example 1, using the compositions and the lamination method as shown in Table 1.

As already mentioned herein above, elongation strength means the force when the laminate is elongated from the original length (100%) to 150% length of the original. When the "force at 50% elongation" as later used herein is small, this means that the laminate can be elongated easily.

The tension strength of the laminate was evaluated using the conventional method using a tension testing machine as described below. Furthermore, the tension strength was evaluated also by the initial inclination test as described below using a wearable contact force sensor.

Force at 50% Elongation

The elastic laminate obtained in each of Examples and Comparative Examples was cut into a width of 50 mm in the CD direction and a length of more than 100 mm in the MD direction, and the obtained sample was set in a tension testing machine (manufactured by Shimadzu Corporation: AG-20kNG) so that the two chucks hold the ends of the elastic laminate in the MD direction, i.e. the direction vertical to the activation direction of the above-mentioned extension/activation treatment. The distance of the two chucks holding the elastic laminate was set to 40 mm. The elastic laminate was extended by 100% at an elongation speed of 300 mm/min. After having been extended by 100%, the laminate was released from the extended state to the original state, i.e., to the length of 40 mm. The tension strength at the elongation of 50% was defined as the force at 50% elongation.

Initial Inclination Test

Figure 2:
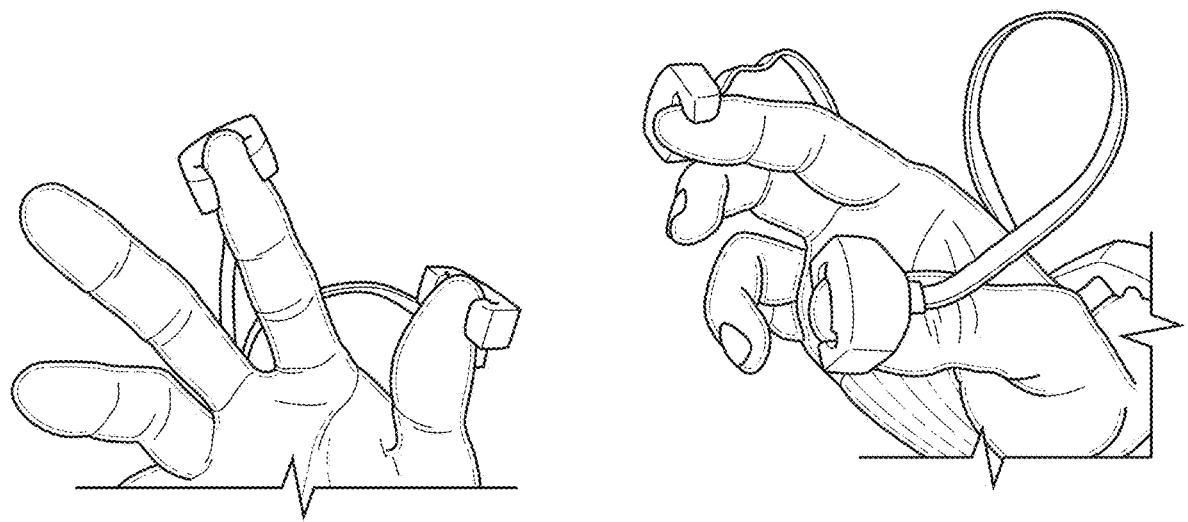
FIG. 2 is a photograph showing a right hand wearing the wearable contact force sensors used in the Examples and Comparative Examples.
Figure 3:
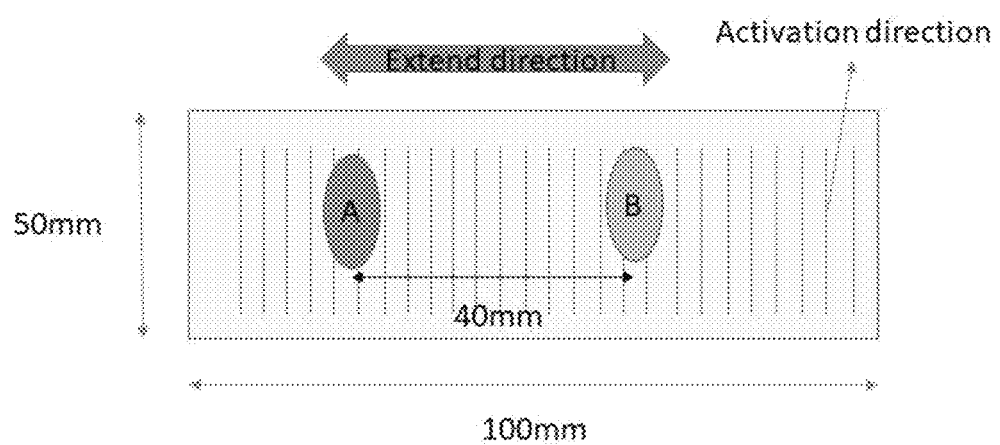
FIG. 3 is a schematic view showing the elastic laminate used in the initial inclination test performed in the Examples and Comparative Examples.

The initial inclination test, which can also be referred to as initial elongation (0-100% elongation) test, was performed to evaluate the tension strength of the laminate using a wearable contact force sensor HapLog Haptic Skill Logger produced by KATO TECH Co., Ltd. A wearable contact force sensor was set on each of the tip of the thum and the index finger of a right hand as shown in FIG. 2. The calibration was done with the thum and the index finger using a calibration unit. Each laminate obtained in above Examples and Comparative Examples was cut into the size of 50 mm in the CD direction×100 mm in the MD direction as shown in FIG. 3. One end of the laminate (the portion A shown in FIG. 3) was held by the thum and the index finger of the left hand not wearing any sensors, and the other end of the laminate (the portion B shown in FIG. 3) was held by the thum and the index finger of the right hand wearing the sensors, so that the distance between the centers of the portions held by the left hand and the right hand is 40 mm as shown in FIG. 3. The elastic laminate was extended by 100% (to the distance of 80 mm) in 0.5 seconds and immediately brought back to the original state, i.e., to the length of 40 mm in the next 0.5 seconds. Thus, the elongation speed was about 4800 mm/min. The tension strength was determined by the contact force sensors attached to the thum and the index finger of the right hand. The tension strength at elongation by 50% was defined as the initial inclination and was determined by the software installed in the HapLog Haptic Skill Logger. The measurement was performed three times for each sample and the average of the three values is shown in Table 1.

Easy to Wear Diaper
○: Excellent: The value of Force at 50% elongation [N/50 mm] is less than 20N, and initial inclination [N/mm] is less than 0.7.

Δ: Good: The value of Force at 50% elongation [N/50 mm] is greater than or equal to 20N and less than 25, and initial inclination [N/mm] is greater than or equal to 0.7 and less than 1.0.

x: Not good: The value of Force at 50% elongation [N/50 mm] is greater than or equal to 25N, and initial inclination [N/mm] is greater than or equal to 1.0.

For example, when comparing Example 2 and Example 7, a difference lies in the total thickness of multilayer film. Due to thinner film, the force at 50% elongation becomes lower as obtained in Example 7. When comparing Example 2 and Example 8, differences are thickness of multilayer film and activation/elongation ratio. Example 8 needs more force to be elongated to 150% length. Comparing Example 3 and Example 4, the difference lies in activation or without activation. More force is needed in case of the laminate in Example 4, without activation, as the elongation force is higher than that in Example 3.

TABLE 1

| | Unit | Example 1 | Example 2 | Example 3 | Example 4 | Example 5 | Example 6 |
|---|---|---|---|---|---|---|---|
| A layer resin 1 | | Vistamaxx 3980 | Vistamaxx 3980 | Vistamaxx 3980 | Vistamaxx 3980 | Vistamaxx 3980 | Vistamaxx 3980 |
| A layer resin 2 | | 52518 (HDPE) | 52518 (HDPE) | 5251 (HDPE) | 52518 (HDPE) | PP756C (r-PP) | PP756C (r-PP) |
| B layer resin 3 | | Quintac 3390 | Quintac 3390 | Quintac 3390 | Quintac 3390 | Quintac 3390 | Quintac 3390 |
| B layer resin 4 | | Quintac 3620 | Quintac 3620 | Quintac 3620 | Quintac 3620 | Quintac 3620 | Quintac 3620 |
| B layer resin 5 | | TiO2 MB (LDPE/TiO2 = 30 wt %/70 wt %) | TiO2 MB (LDPE/TiO2 = 30 wt %/70 wt %) | TiO2 MB (LDPE/TiO2 = 30 wt %/70 wt %) | TiO2 MB (LDPE/TiO2 = 30 wt %/70 wt %) | TiO2 MB (LDPE/TiO2 = 30 wt %/70 wt %) | TiO2 MB (LDPE/TiO2 = 30 wt %/70 wt %) |
| A layer composition 1/2 | | 50/50 | 50/50 | 50/50 | 50/50 | 50/50 | 50/50 |
| B layer composition 3/4/5 | | 46.5/46.5/7 | 46.5/46.5/7 | 46.5/46.5/7 | 46.5/46.5/7 | 46.5/46.5/7 | 46.5/46.5/7 |
| Layer thickness A/B/A | μm | 2/46/2 | 2/46/2 | 2/46/2 | 2/46/2 | 2/46/2 | 1.6/35.8/1.6 |
| Film total thickness | μm | 50 | 50 | 50 | 50 | 50 | 40 |
| Nonwoven kinds | | Spunbond | Carded | Spunlace | Spunlace | Carded | Carded |
| Nonwoven grammage of both side | | 20 | 24 | 30 | 30 | 24 | 24 |
| Lamination method | | Adhesive coating | Adhesive coating | Adhesive coating | Adhesive coating | Adhesive coating | Adhesive coating |
| Laminated ratio of activation area | % | 49 | 42 | 42 | 42 | 49 | 49 |
| Activation ratio | % | 250 | 250 | 250 | 250 | 250 | 250 |
| Force at 50% elongation | N/50 mm | 8.5 | 7.8 | 2.5 | 4.5 | 7.8 | 6.7 |
| Initial inclination | N/mm | 0.33 | 0.09 | 0.07 | 0.10 | 0.09 | 0.08 |
| Easy to wear diaper (○/△/×) | | ○ | ○ | ○ | ○ | ○ | ○ |

| | Unit | Example 7 | Example 8 | Example 9 | Example 10 | Example 11 | Example 12 |
|---|---|---|---|---|---|---|---|
| A layer resin 1 | | Vistamaxx 3980 | Vistamaxx 3980 | Vistamaxx 3980 | Vistamaxx 3980 | Vistamaxx 3980 | Vistamaxx 3980 |
| A layer resin 2 | | 52518 (HDPE) | 52518 (HDPE) | 52518 (HDPE) | 52518 (HDPE) | PP756C (r-PP) | PP756C (r-PP) |
| B layer resin 3 | | Quintac 3390 | Quintac 3390 | Quintac 3390 | Quintac 3390 | Quintac 3390 | Quintac 3390 |
| B layer resin 4 | | Quintac 3620 | Quintac 3620 | — | Quintac 3620 | Quintac 3620 | Quintac 3620 |
| B layer resin 5 | | TiO2 MB (LDPE/TiO2 = 30 wt %/70 wt %) | TiO2 MB (LDPE/TiO2 = 30 wt %/70 wt %) | TiO2 MB | TiO2 MB (LDPE/TiO2 = 30 wt %/70 wt %) | TiO2 MB (LDPE/TiO2 = 30 wt %/70 wt %) | TiO2 MB (LDPE/TiO2 = 30 wt %/70 wt %) |
| A layer composition 1/2 | | 50/50 | 50/50 | 50/50 | 50/50 | 50/50 | 50/50 |
| B layer composition 3/4/5 | | 46.5/46.5/7 | 46.5/46.5/7 | 93/0/7 | 46.5/46.5/7 | 46.5/46.517 | 46.5/46.5/7 |
| Layer thickness A/B/A | μm | 2/46/2 | 1.6/36.8/1.6 | 2/46/2 | 2/46/2 | 2/46/2 | 2/46/2 |
| Film total thickness | μm | 50 | 40 | 50 | 50 | 50 | 50 |
| Nonwoven kinds | | Carded | Carded | Carded | Spunlace | Spunlace | Sounlace |
| Nonwoven grammage of both side | | 24 | 24 | 24 | 30 | 30 | 30 |

TABLE 1-continued

| | Unit | Example 13 | Example 14 | Example 15 | Example 16 | Example 17 | Example 18 |
|---|---|---|---|---|---|---|---|
| Lamination method | | Adhesive coating | Adhesive coating | Adhesive coating | Ultrasonic bonding | Ultrasonic bonding | Heat bonding |
| Laminated ratio of activation area | % | 42 | 49 | 49 | 8 | 8 | 8 |
| Activation ratio | % | 250 | 150 | 250 | 0 | 0 | 0 |
| Force at 50% elongation | N/50 mm | 6.7 | 18.1 | 12.6 | 3.6 | 4.0 | 7.5 |
| Initial inclination | N/mm | 0.07 | 0.10 | 0.28 | 0.05 | 0.05 | 0.15 |
| Easy to wear diaper (○/Δ/×) | | ○ | ○ | ○ | ○ | ○ | ○ |

| | Example 13 | Example 14 | Example 15 | Example 16 | Example 17 | Example 18 |
|---|---|---|---|---|---|---|
| A layer resin 1 | Vistamaxx 3980 | Vistamaxx 3980 | Vistamaxx 3980 | Vistamaxx 3980 | Vistamaxx 3980 | Vistamaxx 3980 |
| A layer resin 2 | 52518 (HDPE) | 52518 (HDPE) | 52518 (HDPE) | PP756C (r-PP) | PP756C (r-PP) | 52518 (HDPE) |
| B layer resin 3 | Quintac 3390 | Quintac 3390 | Quintac 3300 | Quintac 3390 | Quintac 3390 | Quintac 3390 |
| B layer resin 4 | QUintac 3620 | Quintac 3620 | Quintac 3620 | Quintac 3620 | Quintac 3620 | Quintac 3620 |
| B layer resin 5 | TiO2 MB (LDPE/TiO2 = 30 wt %/70 wt %) | TiO2 MB (LDPE/TiO2 = 30 wt %/70 wt %) | TiO2 MB (LDPE/TiO2 = 30 wt %/70 wt %) | TiO2 MB (LDPE/TiO2 = 30 wt %/70 wt %) | TiO2 MB (LDPE/TiO2 = 30 wt %/70 wt %) | TiO2 MB (LDPE/TiO2 = 30 wt %/70 wt %) |
| A layer composition 1/2 | 50/50 | 50/50 | 30/70 | 50/50 | 50/50 | 0/100 |
| B layer composition 3/4/5 | 46.5/46.5/7 | 46.5/46.5/7 | 46.5/46.517 | 46.5/46.5/7 | 46.5/46.5/7 | 46.5/46.5/7 |
| Layer thickness A/B/A | 2/46/2 | 2/46/2 | 1.6/36.8/1.6 | 1.4/32.2/1.4 | 1.6/36.8/1.6 | 1.6/36.8/1.6 |
| Film total thickness | 50 | 50 | 40 | 35 | 40 | 40 |
| Nonwoven kinds | Spunbond | Carded | Spunbond | Spunbond | Carded | Carded |
| Nonwoven grammage of both side | 20 | 24 | 20 | 20 | 24 | 24 |

| | Unit | Comparative example 1 | Comparative example 2 | Comparative example 3 | Comparative example 4 | Comparative example 5 | Comparative example 6 |
|---|---|---|---|---|---|---|---|
| Lamination method | | Ultrasonic bonding | Ultrasonic bonding | Ultrasonic bonding | Ultrasonic bonding | Ultrasonic bonding | Ultrasonic bonding |
| Laminated ratio of activation area | % | 8 | 8 | 8 | 8 | 14 | — |
| Activation ratio | % | 250 | 150 | 250 | 250 | 250 | 250 |
| Force at 50% elongation | N/50 mm | 7.3 | 15.3 | 6.8 | 3.4 | 13.5 | 8.2 |
| Initial inclination | N/mm | 0.29 | 0.23 | 0.15 | 0.04 | 0.24 | 0.35 |
| Easy to wear diaper (○/Δ/×) | | ○ | ○ | ○ | ○ | ○ | ○ |

| | Comparative example 1 | Comparative example 2 | Comparative example 3 | Comparative example 4 | Comparative example 5 | Comparative example 6 |
|---|---|---|---|---|---|---|
| A layer resin 1 | Vistamaxx 3980 | Vistamaxx 3980 | Vistamaxx 3980 | Vistamaxx 3980 | Vistamaxx 3980 | Vistamaxx 3980 |
| A layer resin 2 | 52518 (HDPE) | 52518 (HDPE) | PP756C (r-PP) | 52518 (HDPE) | 52518 (HDPE) | 52518 (HDPE) |
| B layer resin 3 | Quintac 3390 | Quintac 3390 | Quintac 3390 | Quintac 3390 | Quintac 3390 | Quintac 3390 |
| B layer resin 4 | Quintac 3620 | Quintac 3620 | Quintac 3620 | Quintac 3620 | Quintac 3620 | Quintac 3620 |
| B layer restn 5 | TiO2 MB (LDPE/TiO2 = 30 wt %/70 wt %) | TiO2 MB (LDPE/TiO2 = 30 wt %/70 wt %) | TiO2 MB (LDPE/TiO2 = 30 wt %/70 wt %) | TiO2 MB (LDPE/TiO2 = 30 wt %/70 wt %) | TiO2 MB (LDPE/TiO2 = 30 wt %/70 wt %) | TiO2 MB (LDPE/TiO2 = 30 wt %/70 wt %) |
| A layer composition 1/2 | 50/50 | 50/50 | 50150 | 50/50 | 50/50 | 50/50 |
| B layer composition 3/4/5 | 46.5/46/7 | 46.5146.5/7 | 46.5/46.5/7 | 46.5/46.5/7 | 46.5/46.5/7 | 46.5/46.5/7 |
| Layer thickness A/B/A | 2/46/2 | 2146/2 | 1.6/36.8/1.6 | 2.8/64.4/2.8 | 2.8/64.4/2.8 | 10/30/10 |
| Film total thickness | 50 | 50 | 40 | 70 | 70 | 50 |
| Nonwoven kinds | Spunbond | Carded | Spunbond | Sounbond | Spunbond | Spunbond |
| Nonwovengrammage of both side | 20 | 24 | 20 | 20 | 20 | 20 |

TABLE 1-continued

| | | Adhesive coating | Adhesive coating | Adhesive coating | Adhesive coatin | Adhesive coating | Adhesive coating | Adhesive coating |
|---|---|---|---|---|---|---|---|---|
| Lamination method | | | | | | | | |
| Laminated ratio of activation area | % | 49 | 42 | 42 | 42 | 42 | 49 | 49 |
| Activation ratio | % | 0 | 0 | 0 | 0 | 0 | 0 | 0 |
| Force at 50% elongation | N/50 mm | 40.2 | 28 | 407 | 41.5 | 20.6 | 26.1 | |
| initial inclination | N/mm | 1.22 | 0.85 | 1.21 | 1.32 | 0.82 | 1.23 | |
| Easy to weal diaper (○/Δ/×) | | × | × | × | × | Δ | × | |

| | Unit | Comparative example 7 |
|---|---|---|
| A layer resin 1 | | Vistamaxx 3980 |
| A layer resin 2 | | 52518 (HDPE) |
| B layer resin 3 | | Quintac 3390 |
| B layer resin 4 | | Quin ac 3620 |
| B layer resin 5 | | TiO2 MB (LDPE/TiO2 = 30 wt %/70 wt %) |
| A layer composition 1/2 | | 50/50 |
| B layer composition 3/4/5 | | 46.5/46.5/7 |
| Film thickness A/B/A | μm | 10/30/10 |
| Film total thickness | μm | 50 |
| Nonwoven kinds | | Spunbond |
| Nonwoven grammage of both side | | 20 |
| Lamination method | | Adhesive coating |
| Laminated ratio of activation area | % | 42 |
| Activation ratio | % | 0 |
| Force at 50% elongation | N/50 mm | Break |
| Initial inclination | N/mm | Break |
| Easy to wear diaper (○/Δ/×) | | × |

EXPLANATION OF THE REFERENCE SIGNS

1 Non-woven layer
2 Multilayer film
3 Hotmelt pressure-sensitive adhesive layer
4a, 4b A pair of ring rolls

The invention claimed is:

1. An elastic laminate comprising
a multilayer film comprising at least two first elasticity skin layers and at least one second elasticity core layer, the first elasticity skin layers arranged on both sides of the at least one second elasticity core layer, said second elasticity core layer having higher elasticity than the sandwiching first elasticity skin layers, wherein the first elasticity skin layers comprise an olefin polymer, and the second elasticity core layer comprise an elastomer layer, and
said multilayer film having arranged on both outer surfaces thereof non-woven layers bonded either (i) through hotmelt pressure-sensitive adhesive layers or (ii) ultrasonic bonding or thermal bonding,
wherein the elastic laminate has an elongation strength of less than 20 N/50 mm width as elongated by 50% with 300 mm/min elongation speed,
wherein the total film thickness of the multilayer film is in the range of 26 to 60 μm,
the ratio of the total thickness of the first elasticity layers to the total thicknesses of the second elasticity core layer(s) is in the range of 1:10 to 1:25,
wherein a laminated ratio of activation area is 8% to 49%,
wherein an activation ratio is from 150% to 300%,
wherein the non-woven fabric layers are selected from spunbonded non-woven or carded non-woven, and
wherein predetermined parts of the elastic laminate have been subjected to an extension treatment, wherein the fiber structure of the non-woven fabric layers on said predetermined parts of the elastic laminate is mechanically loosened.

2. The elastic laminate according to claim 1, wherein the tension strength of the elastic laminate at elongation by 50% determined by a wearable contact force sensor HapLog Haptic Skill Logger produced by KATO TECH Co., Ltd. is 0.15 N/mm or less.

3. The elastic laminate according to claim 1, wherein the first elasticity skin layers comprises a combination of an olefin-based elastomer and a crystalline olefin polymer.

4. The elastic laminate according to claim 3, wherein the content of said crystalline olefin polymer in the first elasticity layers is 25 wt % or more.

5. The elastic laminate according to claim 1, wherein the second elasticity core layer comprises a combination of at least two kinds of styrene-based elastomers (a) and (b), which differ in the styrene content in that the styrene-based elastomer (a) has a styrene content in the range of 30 to 60 wt %, while the styrene-based elastomer (b) has a styrene content in the range of 10 to 29 wt %.

6. The elastic laminate according to claim 5, wherein the contents of the styrene-based elastomers (a) and (b) in said second elasticity core layer are in the range of 35 to 60 wt % each.

7. The elastic laminate according to claim 5, wherein the styrene-based elastomer (a) has a di-block content of less than 5% and the styrene-based elastomer (b) has a di-block content in the range of 10 to 20%.

8. The elastic laminate according to claim 5, wherein the styrene-based elastomers (a) and (b) are selected from SIS-based elastomers and/or SBS-based elastomers.

9. The elastic laminate according to claim 5, wherein the styrene-based elastomers (a) and (b) are selected from SIS-based elastomers, particularly an SIS-based elastomer including a styrene-isoprene-styrene block copolymer molecular structure having different terminal styrene block chain lengths.

10. The elastic laminate according to claim 3, wherein the olefin-based elastomer in the first elasticity layer is an α-olefin based elastomer.

11. The elastic laminate according to claim 3, wherein the crystalline olefin polymer in the low elasticity layer is at least one kind selected from HDPE, r-PP, or LDPE.

12. An article which includes the elastic laminate according to claim 1.

13. A process for producing the elastic laminate according to claim 1, comprising
directly bonding the at least one second elasticity core layer and the at least two first elasticity skin layers with each other to provide a multilayer film,
bonding a non-woven fabric on both outer surfaces of the multilayer film either (i) through hotmelt pressure-sensitive adhesive or (ii) ultrasonic bonding or thermal bonding to provide an elastic laminate, and
subjecting predetermined parts of the elastic laminate to an extension treatment, wherein the fiber structure of the non-woven fabric layers on said predetermined parts of the elastic laminate is mechanically loosened.

* * * * *